United States Patent [19]

Walsh

[11] 4,114,446

[45] Sep. 19, 1978

[54] TEMPERATURE MEASUREMENT WITH THREE LEAD RESISTANCE THERMOMETERS

[75] Inventor: Thomas Joseph Walsh, Hatboro, Pa.

[73] Assignee: Leeds & Northrup Company, North Wales, Pa.

[21] Appl. No.: 750,075

[22] Filed: Dec. 13, 1976

[51] Int. Cl.² .............................................. G01K 7/24
[52] U.S. Cl. ............................................... 73/362 AR
[58] Field of Search ................ 73/362 AR; 323/1, 4, 323/7

[56] References Cited

U.S. PATENT DOCUMENTS

| | | | |
|---|---|---|---|
| 3,651,696 | 3/1972 | Rose | 73/362 AR |
| 3,754,442 | 8/1973 | Arnett | 73/362 AR |
| 3,805,616 | 4/1974 | Sugiyama | 73/362 AR |
| 3,864,623 | 2/1975 | Luce | 323/1 |
| 3,906,796 | 9/1975 | Dumbeck | 73/362 AR |
| 3,913,403 | 10/1975 | Arcara | 73/362 AR |

Primary Examiner—James J. Gill
Attorney, Agent, or Firm—William G. Miller, Jr.; Raymond F. MacKay

[57] ABSTRACT

Measurement with a three-lead resistance thermometer uses two current sources to set up a current I in the thermometer element and each of its potential leads while a current of 2I is established in the current lead with all currents being in a direction such that the currents in the potential leads are in the same direction with respect to the thermometer element. A standard resistor is connected in series with one potential lead and a voltage measurement is made across the potential leads, including the standard resistor, to provide a measure of the temperature being sensed by the resistance thermometer. The current sources each utilizes a voltage divider connected between one terminal of a constant potential source and another terminal along with a follower circuit connected to receive an input from an intermediate point on the voltage divider. The follower circuit has a gain of magnitude corresponding with the reciprocal of the fraction of the potential used from the voltage divider and produces an output into a calibrating resistor through which a specific current is to be maintained. Each current source also includes a second voltage follower circuit for producing the potential at the other terminal of the voltage divider circuit as required to control the current in the calibrating resistor.

6 Claims, 1 Drawing Figure

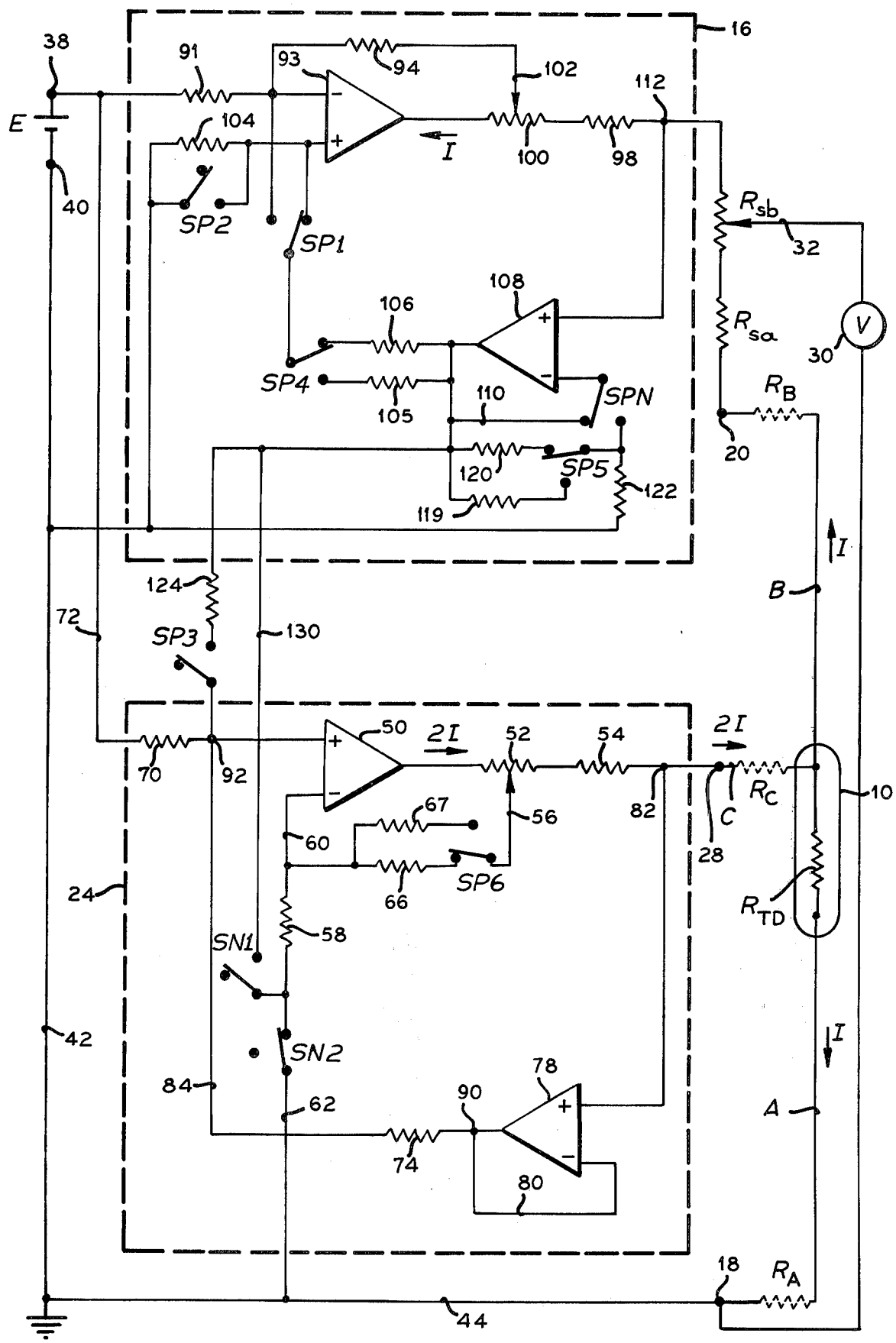

TEMPERATURE MEASUREMENT WITH THREE LEAD RESISTANCE THERMOMETERS

BACKGROUND OF THE INVENTION

This invention relates to the measurement of temperature by the use of resistance thermometers and more particularly to measurements using resistance thermometers of the three-lead type. This invention is an improvement of the temperature measuring means disclosed in U.S. Pat. No. 3,913,403 issued to S. A. Arcara on Oct. 21, 1975. The disclosure of that patent is hereby incorporated by reference as a part of the description of the present invention. Particular reference should be made to the specification of the referenced U.S. patent from column 1 through column 3, as it deals with FIGS. 1 through 4 of the patent.

It is an object of the present invention to provide an improved system for measuring the resistance of a resistance thermometer of the three-lead type.

More particularly, it is an object of this invention to provide apparatus for making such measurements with three-lead resistance thermometers of varied types with a minimum of common mode interference.

It is another object of this invention to provide a means for making a temperature measurement with a resistance thermometer in a manner which will provide for a linear temperature scale on the voltage measuring instrument utilized to indicate the temperature being measured by the resistance thermometer.

SUMMARY OF THE INVENTION

In carrying out the invention there is provided apparatus for measuring a temperature change with a three-lead resistance thermometer having first and second potential leads connected to opposite ends of the thermometer element and a current lead connected to that end of the thermometer element to which the first potential lead is connected, the combination including a standard resistor of value corresponding to a base resistance value for the resistance thermometer at a particular temperature. Means are provided for connecting one end of that resistor to the first potential lead of the resistance thermometer with two constant current sources being connected to the second potential lead, said current lead and the other end of the resistor. Each of the constant current sources includes a connection to a constant potential source, a calibrating resistor, a first operational amplifier having an output connected to the calibrating resistor, as well as a first and second voltage divider along with a second operational amplifier and its associated feedback circuit. The first voltage divider has two terminals and an intermediate potential tap with one of the terminals being connected to a terminal of the potential source and the intermediate potential tap being connected to the non-inverting input of the first amplifier so the potential at the non-inverting input is a fraction of the potential difference between the terminals of the voltage divider. The second voltage divider has two terminals and an intermediate potential point with one of the terminals being connected to the end of the calibrating resistor nearest the output of the first amplifier and the last-named intermediate point being connected to the inverting input of the first amplifier so that the fraction of the potential difference across the second voltage divider, appearing at the intermediate point, corresponds with the fraction of the first voltage divider. The second operational amplifier has its non-inverting input connected to the terminal of the calibrating resistor farthest from the output of the first amplifier and has its inverting input connected to its output as required to provide the necessary gain so that with the output connected to a second terminal of the first voltage divider, the current through the calibrating resistor is at the desired value.

BRIEF DESCRIPTION OF THE DRAWING

The single FIGURE is a circuit diagram of the improved resistance thermometer measuring circuit of the invention.

DESCRIPTION OF THE PREFERRED EMBODIMENT

The circuit of the drawing is similar to FIG. 3 of the referenced U.S. Pat. No. 3,913,403 except that the drawing of the present application includes a standard resistor such as is incorporated in FIG. 2 of the referenced patent as $R_S$.

In the FIGURE, the three-lead resistance thermometer is shown as including a resistance element $R_{TD}$ which may typically be a wound resistance element enclosed in a case 10. That element is connected by three leads A, B and C to terminals 18, 20 and 28, respectively. The terminals 18, 20 and 28 are provided for connection to the measuring circuit and current sources for measurement of the temperature being detected by the element as it is manifested as a change in resistance of the element $R_{TD}$.

Two of the leads connecting opposite ends of the resistance element $R_{TD}$, such as leads A and B, are considered as the potential leads to the element by virtue of the fact that it is intended that those leads be utilized for measuring the potential drop across the element. The remaining lead, namely C, is typically known as the current lead since its sole function is for the purpose of providing for current flow through the resistance element $R_{TD}$ for generating the potential drop to be measured.

As shown in the FIGURE, the leadwire A may be considered as having resistance $R_A$ shown symbolically in phantom. Similarly, the leadwire B has a leadwire resistance $R_B$ and the leadwire C has a resistance $R_C$. Both $R_B$ and $R_C$ are also shown in phantom to distinguish them from the discrete circuit element.

In order to measure the resistance of the resistance thermometer element $R_{TD}$, two current sources are used. One current source 16 is utilized to produce a current flow in potential lead B of a certain value I in a direction away from the resistance thermometer element $R_{TD}$, as shown by the arrow associated with lead B. Another current source 24 produces a current toward the same end of the resistance thermometer in current lead C whose magnitude is twice the magnitude of the current produced by the source 16 (2I).

The potential lead connected to the opposite end of the resistance thermometer $R_{TD}$, namely lead A, carries a current I to the grounded circuit common lead 44. Thus, the current source 24 by itself tends to produce a current flow of magnitude 2I through the loop including leads C and A; however, since the current source 16 causes a current flow I through the lead B away from the resistance thermometer $R_{TD}$, the resulting current flowing through the resistance thermometer and lead A is then equal to I, as indicated in the drawing.

With the arrangement shown, the voltage drop across the resistance thermometer including the lead A, resistance thermometer element $R_{TD}$, and the lead B are such that there is a cancellation of the potential drops across the lead resistances $R_A$ and $R_B$ so that there is produced between the terminals 18 and 20 a voltage corresponding with the voltage drop produced by the current I flowing through the resistance $R_{TD}$ of the resistance thermometer element itself at its existing temperature. It is therefore possible to utilize a voltmeter 30, as shown in the FIGURE, between the terminals 18 and 20 (not shown) to make a direct voltage measurement of the voltage drop across the element $R_{TD}$, and that voltage may be appropriately converted to a temperature measurement which is independent of the lead resistance associated with the resistance thermometer.

The resistance thermometer element $R_{TD}$ has a resistance whose magnitude is of a particular value at a particular temperature, such as 100 ohms at 0° C., for example. The resistance element itself may typically be made of copper, platinum or nickel. Since the change in resistance with change in temperature of the copper resistance thermometers is linear, the circuit for measuring the temperature with such a thermometer is the simplest version of the present invention and it is that shown in the FIGURE with the movable contacts of the various switches SP1, SP2, SP3, SP4, SP5, SPN, SN1 and SN2 in the positions shown. The current sources 16 and 24 must necessarily interact whenever the resistance element $R_{TD}$ is made of either platinum or nickel since the change in resistance of those elements with a change in temperature is nonlinear and it is necessary that the values of the current 2I and I vary together as the temperature being measured changes. This is accomplished by changing the nature of the circuit by actuating specific switches in the circuit, as will be described subsequently.

For purposes of calibration, the tap 32 on resistor $R_{sb}$ is variable so that the resistance of the resistor $R_{sa}$ plus that portion of the resistance $R_{sb}$ below the tap 32 combine to provide a standard resistor which has a resistance which can be adjusted to be equal to the resistance of the thermometer $R_{TD}$ at a standard temperature such as 0° C. With such a setting for the tap 32 the voltmeter 30, when connected to tap 32 as shown, will read zero at 0° C. and can be calibrated in degrees centigrade since any changes in the resistance of the thermometer $R_{TD}$ will be detected as a change in the voltage measured by the voltmeter 30 from the resistance corresponding to 0° C. If desired, of course, the resistors $R_{sa}$ and $R_{sb}$ can be omitted with a corresponding change in the calibration of voltmeter 30. With the resistors $R_{sa}$ and $R_{sb}$ in the circuit, the tap 32 is a zero adjusting tap for voltmeter 30.

The current sources 16 and 24 are supplied with a constant potential E as from the battery connected to terminals 38 and 40 with the terminal 38 being at a positive potential with respect to the terminal 40. The terminal 40 may be considered as being connected to a circuit common connection which may be grounded, as shown. Thus, the circuit common for the circuit of the FIGURE includes the leads 42 and 44. It will thus be evident that with the circuit of the FIGURE the potential source is connected to circuit common as is the resistance thermometer $R_{TD}$ at terminal 18. Likewise, the detector in the form of voltmeter 30 is connected to circuit common. With the potential source, the resistance thermometer and the detector all connected to the circuit common, it is possible to minimize common mode interference in the circuit.

It will be evident that the apparatus which makes up the current source 24 serves to produce a constant current through the resistor $R_{TD}$ and resistors $R_{sa}$ and $R_{sb}$ which in combination may be considered the load resistor for source 24. The current 2I flows in the output circuit of the operational amplifier 50, which is of the differential type, and the current from the output of the differential amplifier 50 flows through resistor 52 and resistor 54. The resistor 52 has an adjustable tap 56 for tapping off a portion of the potential across resistor 52. The resistor 54 and that portion of the resistor 52 to the right of the tap 56 in the FIGURE serve as a calibrating resistor. The current source 24 further includes a first circuit resistor 58 and means connecting the inverting input of the operational amplifier 50 to one terminal of the constant potential source through the first circuit resistor 58. That means would include the leads 60 to the inverting input of the operational amplifier 50, the closed switch SN2, and the lead 62 which is connected to the common 44. The common, of course, forms one terminal of the constant source E.

A second circuit resistor 66, which is a resistor having a value with a predetermined relationship to the first resistor 58, is connected through the tap 56 of potentiometer 52, which is the terminal of the calibrating resistor opposite the terminal nearest the load resistor. The resistor 66 is also connected to the inverting input of amplifier 50 through lead 60.

The current source 24 also includes the third resistor 70 and means for connecting the non-inverting input of the amplifier 50 to the other terminal of the constant potential source, namely terminal 38, through the third resistor 70 by way of lead 72.

A fourth resistor 74 is provided. That resistor has a value which has a predetermined relationship to the value of resistor 70, and that predetermined relationship corresponds with the relationship of the resistor 58 to the resistor 66.

A second operational amplifier 78 is also a part of the current source 24. That operational amplifier has its output terminal connected to its inverting input by way of a feedback circuit comprising lead 80, and there is provided means for connecting the non-inverting input of the amplifier 78 to the terminal 82 of the calibrating resistor opposite the terminal formed by the tap 56. Means are also provided for connecting the fourth resistor 74 between the output terminal of the amplifier 78 and non-inverting input of the amplifier 50 by way of lead 84. Thus, it will be seen that the amplifier 50 in conjuction with the resistors 58, 66, 70 and 74 as well as a portion of resistor 52, namely that portion to the left of tap 56, form a follower circuit such that the potential at the output of amplifier 50 tends to follow the potential at terminal 92.

The combination of the resistors 70 and 74 form a voltage divider which is connected between one terminal of the constant potential source, namely terminal 38, and terminal 90, which is the other terminal of the voltage divider. The follower circuit, which includes the amplifier 50, is connected to receive an input from an intermediate potential point 92 on the voltage divider made up of resistors 70 and 74, such that the potential level at that point is at a value offset from the potential at the terminal 90 by an amount which is a fraction of the potential span of the divider, that is the span between the potential at terminal 38 and at terminal 90. The first voltage follower circuit, which includes amplifier 50, has a gain of magnitude corresponding with the reciprocal of that fraction, the gain of the circuit being established by the values of the resistors 58 and 66 in the feedback circuit of amplifier 50. The values for the resistors of the follower circuit, for example, may be such that the resistance of resistor 70 is equal to that of resistor 74 so that the potential at terminal 92 is half of the difference between the potential at terminal 38, as compared with that at terminal 90. Similarly, the resistors 66 and 58 may be of equal value so that the potential at the inverting input of amplifier 50 is half of the potential between the tap 56 and the circuit common 44. The amplifier 78 provides a second follower circuit which is connected to produce a potential at terminal 90, which essentially corresponds with the potential at terminal 82.

It will be evident that as the temperature of the resistance thermometer $R_{TD}$ increases and the resistance of that element increases, the potential at 82 will rise and there will be a consequent rise in the potential at terminal 90 and the potential at terminal 92 will also rise; however, the rise in the potential of terminal 92 will be less than that of terminal 90 depending upon the relationship between the resistance of the resistors 70 and 74. Assuming that those resistances are equal as was previously assumed, the rise in the potential at terminal 92 will be half of that which is seen at terminal 90.

The follower circuit which includes the amplifier 50 is such that the amplifier 50 may, for example, have a gain of 2 where the resistors 66 and 58 are equal in value, in which case, of course, the values of the resistors 70 and 74 will be equal in value, also. The potential at terminal 82, of course, will be that potential which is necessary to maintain the current 2I flowing through the resistance $R_c$ and the current I through resistance thermometer $R_{TD}$ and lead resistance $R_A$. Thus, the current source 24 maintains a constant potential drop between the tap 56 and the terminal 82 by virtue of the connection between the follower circuit including amplifier 50 and that including amplifier 78 and thereby maintains a constant current output to terminal 28 of 2I.

While the current source 24 is designed to produce a particular fixed current out of the source, as for example in direction corresponding to the arrow at terminal 28, the current source 16 is designed to produce a fixed current I into the source from terminal 20, as indicated by the arrow in lead B.

In the current source 16 the resistor 91 constitutes the first resistor which is connected to the inverting input of the operational amplifier 93 at one end and is connected at the other end to the terminal 38 which is one terminal of the constant potential source. A second circuit resistor 94 is connected between the terminal of the calibrating resistor of this source which is opposite that terminal of the calibrating resistor nearest the load resistor for this source. In the source 16 the calibrating resistor would include the resistor 98 and that portion of the resistor 100 between the tap 102 and the resistor 98. The load resistor associated with current source 16 may be considered the resistor $R_{sb}$ in combination with the resistor $R_{sa}$.

Assuming, of course, that the switch SP2 in the source 16 is in the position shown, then it will be evident that resistor 104 constitutes the third resistor which is connected between the non-inverting input of amplifier 93 and a terminal of the constant potential source, namely the circuit common at lead 42.

With switch SP4 in the position shown, a fourth resistor 106 is connected from the output of a second operational amplifier 108 to the non-inverting input of the first amplifier 93. The output of the amplifier 108 is connected directly to the inverting input of that amplifier as by the lead 110 through the switch SPN, and the non-inverting input of the amplifier 108 is connected directly to the terminal of the calibrating resistor 98, furthest from the output of amplifier 93, namely at terminal 112.

It will thus be evident that the current source 16 with the switches SP1, SP2, SP4, SP5 and SPN in the positions shown, has a first follower utilizing amplifier 93 which provides a current through the resistors 98 and 100 which is maintained constant by the action of the follower utilizing amplifier 108 which establishes the potential at the non-inverting input of amplifier 93 at a value for maintaining that constant current I through the resistors 98 and 100.

The circuit of the FIGURE as thus far described would be suitable for making temperature measurements with a resistance thermometer $R_{TD}$ of copper since the relationship between the resistance of a copper resistance thermometer and the temperature it is detecting is a linear relationship, and it is adequate therefore to have a single current source 24 producing a constant current of a value 2I out to terminal 28 of the resistance thermometer while producing by means of current source 16 a constant current I into the current source 16 from terminal 20 thus leaving a remaining constant current I to flow through the resistance thermometer to terminal 18. When, however, it is desired to use, for example, a platinum resistance thermometer, which does not have a characteristic which is such as to provide a linear relationship between temperature and resistance, it is then necessary that the switches SP1, SP2, SP3, SP4, SP5, SP6 and SPN be operated to their other positions. When the switches are thus operated, the resistors 119 and 122 are effective in the feedback circuit of amplifier 108 to provide a gain through amplifier 108 which will effectively cause a change in the potential at terminal 92 by virtue of current flow through the resistor 124 and the closed switch SP3 which connects to the non-inverting input of amplifier 50 through terminal 92. Also, the output of the follower, which includes amplifier 108, through the output resistor 105 will be effective through the connection by way of switches SP1 and SP4 to the inverting input of amplifier 93 to affect the output of amplifier 93 which will also be affected by the short circuiting of the resistor 104 by the switch SP2.

What happens in effect is that an increase in the gain of the amplifier 108, resulting from the inclusion of the resistors 120 and 122 into the amplifier circuit, along with a switching of the output of the amplifier circuit from the non-inverting to the inverting input of amplifier 93 and the shorting of resistor 104 serves in response to an increase in $R_{TD}$ to increase the current flow into current source 16 over and above that current which would flow normally in the case of the copper resistance thermometer as previously described. The increase of current into the source 16 is controlled to be proportional to the degree of nonlinearity of the resistance thermometer $R_{TD}$.

The increased gain of amplifier 108 is also by way of its connection through resistor 124 and switch SP3 designed to affect the potential at terminal 92 and thereby control in similar respects the current output of current source 24 so that the amount of increase in the current drawn by the current source 16 is essentially one half of the increase from source 24 resulting from the change in the potential of the output of amplifier 108. Modification of the current flow from source 24 is also affected by the actuation of switch SP6 to substitute resistor 67 for resistor 66 to change the ratio of the resistors in the voltage divider which includes resistor 58 and 66 or 67 (as selected).

When a resistance thermometer utilizing a nickel resistance element is used for temperature measurement, it is necessary to compensate for the resulting nonlinearity in an opposite sense to the compensation required for platinum and for that type of compensation the switches SP1, SP2, SP3, SP4 and SP5 are returned to the positions shown in the diagram while the switches SN1 and SN2 are operated to positions opposite those shown so that the lead 62 is then no longer connected to one side of resistor 58, but instead that side of resistor 58 which was previously connected to lead 62 is now connected through lead 130 to the output of amplifier 108 so that the increased gain of amplifier 108 which results from the switch SPN being in its actuated position, that is in a position opposite that shown in the drawing, provides a change in the potential at the inverting input of amplifier 50 by virtue of the connection of the output of amplifier 108 through line 130, resistor 58 and lead 60.

As a result of these new connections in the current sources 16 and 24, the current into the resistance thermometer from terminal 28 will decrease as the temperature of the resistance thermometer increases and a comparable decrease of one half the amount of decrease from source 24 will be seen in the input to source 16, or in other words, the current I will decrease by one half the amount of the decrease in the current 2I to compensate for the nonlinear relationship of the resistance of the nickel element $R_{TD}$ with a change in temperature.

The circuit of the FIGURE may be advantageously constructed with components as set forth below:

| Resistors | VAlue in Ohms |
|---|---|
| 52 | 500 |
| 54 | 3.01 K |
| 58 | 49.9 K |
| 66 | 49.9 K |
| 167 | 100 K |
| 70 | 49.9 K |
| 74 | 49.9 K |
| 91 | 49.9 K |
| 94 | 49.9 K |
| 98 | 5.76 K |
| 100 | 1 K |
| 104 | 49.9 K |
| 105 | 71.5 K |
| 106 | 49.9 K |
| 119 | 90.9 K |
| 120 | 1.13 M |
| 122 | 49.9 K |
| 124 | 49.9 K |

| Amplifiers | Number |
|---|---|
| 50, 78, 93 and 108 | 3303 |

| Voltage Sources | Volts |
|---|---|
| E | 6.2 V |

Although not shown for purposes of simplifying the drawing, the amplifiers 50, 93 and 108 can advantageously use a capacitor of 0.001 μfd. connected between their output and their inverting input for purposes of stability.

What is claimed is:

1. Apparatus for producing a constant current through a load resistor from a constant potential source having one terminal common with a terminal of said load resistor, comprising:

a calibrating resistor, a first operational amplifier, means connecting the output circuit of said first amplifier to said load resistor through said calibrating resistor, a first circuit resistor, means connecting the inverting input of said first operational amplifier to one terminal of said constant potential source through said first circuit resistor, a second circuit resistor having a value with a predetermined relationship to that of said first resistor, means connecting the output of said first amplifier through said second circuit resistor to said inverting input to form with said first circuit resistor a feedback circuit for said first amplifier, a third circuit resistor, means connecting the non-inverting input of said first amplifier to the other terminal of said constant potential source through said third circuit resistor, a fourth resistor having a value with a predetermined relationship to the value of said third resistor which corresponds to the relationship of said first resistor to said second resistor, a second operational amplifier having its output terminal connected by a feedback circuit to its inverting input, means for connecting the non-inverting input of said second amplifier to the other terminal of said calibrating resistor, and means connecting said fourth resistor between the output terminal of said second amplifier and the non-inverting input of said first amplifier.

2. Apparatus as set forth in claim 1 which the feedback circuit of said second amplifier in the current source connects its output to its inverting input through a non-resistive connection to establish the gain of said second amplifier at a value of one.

3. Apparatus as set forth in claim 1 in which the feedback circuit of said second amplifier in the current source includes a first resistor connecting the output and the inverting input of said second amplifier to said common terminal of said source.

4. Apparatus for producing a controlled current from a constant potential source, comprising:

a calibrating resistor for determining the magnitude of the current produced from said potential source;

a first operational amplifier having an output circuit connected to produce said current through said resistor;

a first voltage divider having two terminals and an intermediate potential tap, one of said terminals being connected to a terminal of said potential source and said intermediate potential tap being connected to the non-inverting input of said first amplifier so that the potential at said non-inverting input is a fraction of the potential difference between the terminals of said voltage divider, a second voltage divider having two terminals and an intermediate potential point, one of said last-named terminals being connected to the end of said calibrating resistor nearest the output of said first amplifier and said last-named intermediate point being connected to the inverting input of said first amplifier so that the fraction of the potential difference across said second voltage divider appearing at said intermediate point corresponds with the fraction of said first voltage divider, a second operational amplifier having its non-inverting input connected to the other end of said calibrating resistor, a feedback circuit connecting the output of said second amplifier to its inverting input to thereby establish the gain of said second amplifier at a predetermined value, means connecting the output of said second amplifier to the other terminal of one of said first and second voltage dividers, and means connecting the remaining one of said other terminals of said first and second voltage dividers to the other terminal of said potential source.

5. Apparatus for measuring a temperature change with a three-lead platinum resistance thermometer having first and second potential leads connected to opposite ends of the thermometer element and the current lead connected to that end of the thermometer element to which said first potential lead is connected, comprising:

a constant potential source;

a standard resistor of value corresponding to a base resistance value for said resistance thermometer at a particular temperature;

means connecting one end of said standard resistor to the first potential lead;

a first current source connected to cause a certain current flow into said current lead, said first current source including:

means for connecting said constant potential source to said first current source, a first calibrating resistor for determining the magnitude of the current produced by said first current source from said potential source, a first operational amplifier having an output circuit connected to produce said current through said first calibrating resistor, a first voltage divider having two terminals and an intermediate potential tap, one of said terminals being connected to one side of said potential source and said intermediate potential tap being connected to the non-inverting input of said first amplifier so that the potential at said non-inverting input is a fraction of the potential difference between the terminals of said voltage divider, a second voltage divider having two terminals and an intermediate potential point, one of said last-named terminals being connected to the end of said first calibrating resistor nearest the output of said first amplifier and the other of said last-named terminals being connected to the other side of said potential source, said last-named intermediate point being connected to the inverting input of said first amplifier so that the fraction of the potential difference across said second voltage divider appearing at said intermediate point tends to correspond with the fraction of said first voltage divider, a second operational amplifier having its non-inverting input connected to the other end of said first calibrating resistor, a feedback circuit connecting the output of said amplifier to its inverting input to thereby establish the gain of said second amplifier at a value of one, means connecting the output of said second amplifier to the other terminal of said first voltage divider; and a second current source connected to cause a current flow out of said first potential lead of a magnitude which is half of said certain magnitude so that a similar current flow of half said certain magnitude flows through said thermometer, said second current source including:

means for connecting said constant potential source to said second current source, a second calibrating resistor for determining the magnitude of current produced by said second current source from said potential source, a third operational amplifier having an output circuit connected to produce said current of half said certain value through said second calibrating resistor, means connecting the non-inverting input of said third amplifier to said other side of said potential source, a third voltage divider having two terminals and an intermediate potential point, one of said last-named terminals being connected to the end of said second calibrating resistor nearest the output of said third amplifier and the other of said last-named terminals being connected to said one terminal of said potential source, said last-named intermediate point being connected to the inverting input of said third amplifier so that fraction of the potential difference across said third voltage divider appearing at said intermediate point tends to correspond with the potential of said other side of said potential source, a fourth operational amplifier having its non-inverting input connected to the other end of said second calibrating resistor, a feedback circuit connecting the output of said fourth amplifier through a resistance to its inverting input which is in turn connected through a resistor to said other side of said potential source to thereby establish the gain of said fourth amplifier at a predetermined value, means connecting the output of said fourth amplifier to the inverting input terminal of said third amplifier through a resistor so as to modify the current produced by said second current source in response to changes in the potential of said other end of said second calibrating resistor so that the current produced increases with an increase in potential of said other end of the second calibrating resistor, means for also connecting the output of said fourth amplifier to the non-inverting input of said first amplifier through a resistance to modify the current produced by said first current source by an amount corresponding to twice the increase of current produced by said second current source; and voltage measuring means connected between the second potential lead and said other end of said standard resistor so as to measure the voltage across the resistance thermometer as an indication of the change in temperature of the resistance thermometer from said particular temperature.

6. Apparatus for measuring a temperature change with a three-lead nickel resistance thermometer having first and second potential leads connected to opposite ends of the thermometer element and a current lead connected to that end of the thermometer element to which said first potential lead is connected, comprising:

a constant potential source, a standard resistor of value corresponding to a base resistance value for said resistance thermometer at a particular temperature, means connecting one end of said standard resistor to the first potential lead, a first current source connected to cause a certain current flow into said current lead, said first current source including:

means for connecting said constant potential source to said first current source, a calibrating resistor for determining the magnitude of the current produced by said first current source from said potential source, a first operational amplifier having an output circuit connected to produce said current through said first calibrating resistor, a first voltage divider having two terminals and an intermediate potential tap, one of said terminals being connected to one side of said potential source and said intermediate potential tap being connected to the non-inverting input of said first amplifier so that the potential at said non-inverting input is a fraction of the potential difference between the terminals of said voltage divider, a second voltage divider having two terminals and an intermediate potential point, one of said last-named terminals being connected to the end of said first calibrating resistor nearest the output of said first amplifier and said last-named intermediate point being connected to the inverting input of said first amplifier so that the fraction of the potential difference across said second voltage divider appearing at said intermediate point tends to correspond with the fraction of said first voltage divider, a second operational amplifier having its non-inverting input connected to the other end of said first calibrating resistor, a feedback circuit connecting the output of said second amplifier to its inverting input to thereby establish the gain of said second amplifier at a value of one, means connecting the output of said second amplifier to the other terminal of said first voltage divider; and a second current source connected to cause a current flow out of said first potential lead of a magnitude half of said certain magnitude so that a similar current flow of half said certain magnitude flows through said thermometer, said second current source including:

means for connecting said constant potential source to said second current source, a second calibrating resistor for determining the magnitude of a current produced by said second current source from said potential source, a third operational amplifier having an output circuit connected to produce said current through said second calibrating resistor, a third voltage divider having two terminals and an intermediate potential tap, one of said terminals being connected to said other side of said potential source and said intermediate potential tap being connected to the non-inverting input of said third amplifier so that the potential at said non-inverting input is a fraction of the potential difference between the terminals of said voltage divider, a fourth voltage divider having two terminals and an intermediate potential point, one of said last-named terminals being connected to the end of said second calibrating resistor nearest the output of said third amplifier and said last-named intermediate point being connected to the inverting input of said third amplifier so that the fraction of the potential difference across said fourth voltage divider appearing at said intermediate point tends to correspond with the fraction of said third voltage divider, a fourth operational amplifier having its non-inverting input connected to the other end of said second calibrating resistor, a feedback circuit connecting the output of said fourth amplifier to its inverting input to thereby establish the gain of said fourth amplifier at a predetermined value, means connecting the output of said fourth amplifier to the other terminal of both said second and third voltage dividers, so as to modify the current produced by said first and second current sources in response to the change in potential of said other end of said second calibrating resistor so that the current produced by each of said current sources in proportion to their respective current outputs with an increase in potential of said other end of said second calibrating resistor, and voltage measuring means connected between the second potential lead and said other end of said standard resistor so as to measure the voltage across said resistance thermometer as an indication of the change in temperature of the resistance thermometer from said particular temperature.

* * * * *